E. L. JOSEPH.
APPARATUS FOR EFFECTING THE STERILIZATION OF WATER BY OZONATION.
APPLICATION FILED NOV. 24, 1909.
1,047,534.
Patented Dec. 17, 1912.
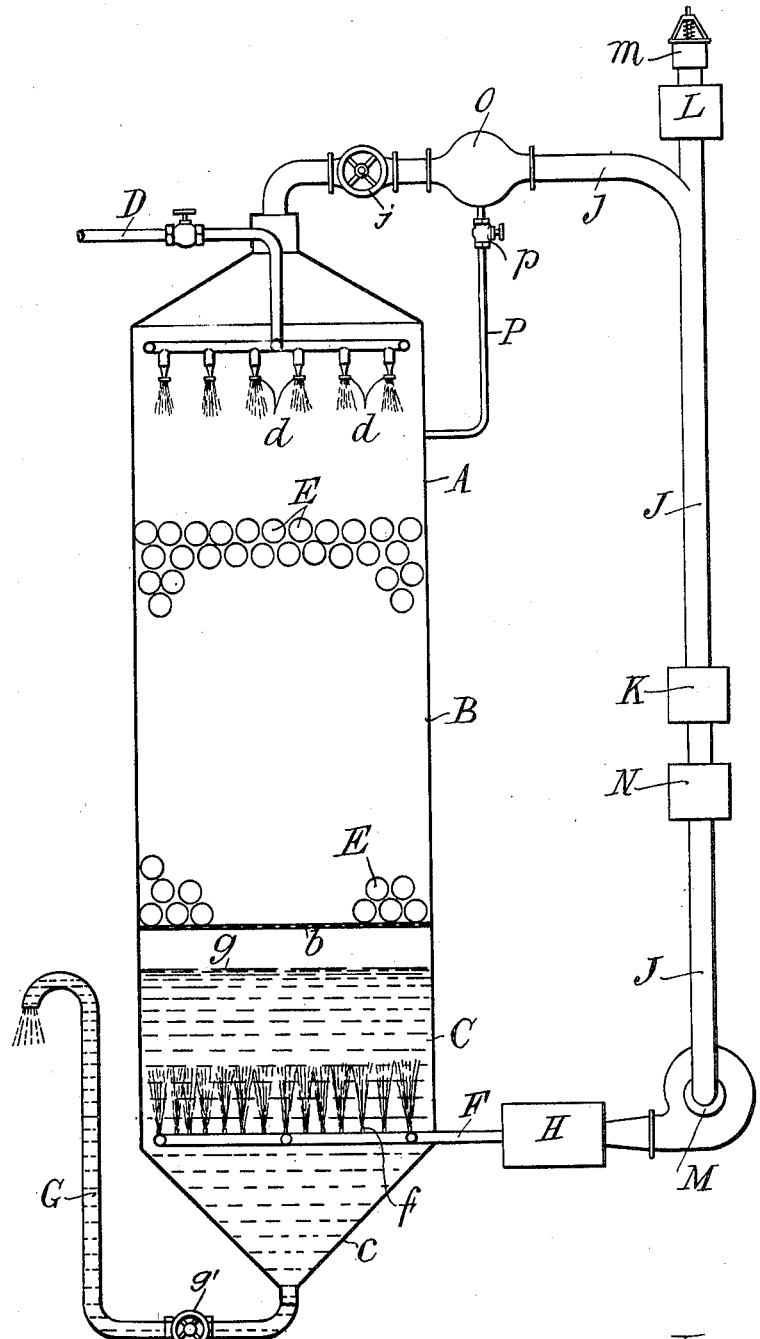

UNITED STATES PATENT OFFICE.

EDWARD LIONEL JOSEPH, OF WESTMINSTER, LONDON, ENGLAND.

APPARATUS FOR EFFECTING THE STERILIZATION OF WATER BY OZONATION.

1,047,534.  Specification of Letters Patent.  Patented Dec. 17, 1912.

Application filed November 24, 1909. Serial No. 529,688.

*To all whom it may concern:*

Be it known that I, EDWARD LIONEL JOSEPH, a subject of the King of Great Britain, and resident of 96 Victoria street, in the city of Westminster, London, England, managing director, have invented Improved Apparatus for Effecting the Sterilization of Water by Ozonation, of which the following is a specification.

This invention relates to improved apparatus for the continuous sterilization of water by ozonation, the apparatus being designed to enable the operation to be effected more thoroughly and at same time more economically than has heretofore been practicable. To this end the apparatus is so constructed that the water is first atomized in presence of an ascending stream of the sterilizing agent within the upper portion of a vessel, then allowed to fall upon a pile of inert matter in a coarsely but symmetrically granular state occupying the middle portion of the vessel (the water being thereby spread out into thin films) and finally allowed to fall into a tank forming the bottom portion of the vessel through which the ozone is forced upward in fine jets.

The apparatus will be described with reference to the accompanying diagrammatic drawing, which shows the principal part of the apparatus in vertical section.

The apparatus may be said to consist of a modified form of Gay Lussac tower which is preferably circular in horizontal section and may be constructed either of galvanized steel or other metal plates properly protected from the action of the sterilizing agent, or of other material (such as concrete or brickwork) not liable to be acted upon by the gaseous agent. The tower comprises three main sections A, B and C. The upper section A is furnished with the atomizing apparatus comprising an evenly distributed series of spraying nozzles $d$ through which the water, led from a main pipe D, is forced either by gravity or pumping. The middle section B, which has a suitably apertured or foraminous bottom $b$, contains a pile E of glass balls, pebbles, or other inert matter in a coarsely but symmetrically granular state; spherical glass balls of uniform size being preferred on account of the readiness with which both the surface area thus exposed, and also the intersticial capacity of the pile, can be adjusted in accordance with any desired rate of flow of both liquid and gas. The lower section C constitutes a tank, and is provided (preferably near the bottom) with an evenly distributed series of blowing nozzles $f$ connected by a pipe F with the source H of the sterilizing agent, the gas being admitted through the nozzles beneath the surface of the water in the tank.

The tank C is made of a capacity suitably proportioned to the rate of flow, and is provided with a siphon overflow so arranged that all parts of the liquid undergo equal treatment and are exposed to the action of the gaseous agent during a predetermined length of time. For this purpose the bottom $c$ of the tank may be in the shape of an inverted cone, the siphon overflow pipe G leading from the apex of the cone upward to a point on a level with that which the water is required to maintain within the tank, as indicated at $g$. Or the overflow pipe might be fed through an evenly distributed series of apertures within the tank.

For the purpose of producing ozonized air, any suitable apparatus may be employed, a generally convenient form being that for which British Letters Patent No. 7836 of 1907 were previously granted.

The source H of the ozonizing agent is connected by a pipe J with the upper part of the uppermost section A of the tower as indicated, the pipe J being provided in its course with a sudden enlargement as at O so that any free moisture carried upward by the ascending current of gas will be separated from the latter, while the gas may be caused to circulate at a constant rate of flow in an upward direction through the tower, the current of gas being evenly distributed over the cross-sectional area of each section A, B and C. The liquid which accumulates in the chamber O may be returned periodically to any suitable point in the tower A, B, C for example, through a pipe such as P, under the control of a stop-valve as indicated at $p$.

The sterilizing agent before entering the ozonizing apparatus H is preferably caused to pass through suitable drying apparatus as at K, the same procedure being followed each time the current of air is made to circulate through the apparatus. The necessary air pressure may be obtained by means of a blower of any suitable kind interposed as at M in the course of the pipe J, while an automatically acting valve $m$ would be provided on the pipe J for the purpose of admitting fresh air to replace the amount absorbed by the water. The air admitted at *m* should pass through filtering or cleaning apparatus as at L on its way to the pipe J.

If desired the sterilizing agent may be suitably cooled as at N before being introduced into the tower.

The water after leaving the tower by the pipe G may be caused to pass over riffles or the like so as, by thorough exposure to the atmosphere, to be made to give up any of the gaseous sterilizing agent which it had absorbed.

Means may be provided for insuring that in the event of failure of the supply of sterilizing agent, the water shall be automatically cut off from the apparatus and an alarm given.

In working the apparatus, assuming a body of unsterilized water to be contained in tank C, operations are commenced by treating this body of water before any further quantity of water is admitted to the vessel. Hence the supply through nozzles *d* is cut off and the valve *j* on pipe J is opened and the ozonizing apparatus H is set to work, the result being that the gaseous agent is caused to circulate continuously from H upward through the sections C B A of the tower and returned by pipe J and pump M to the inlet of the ozonizing apparatus H. This action (which permits of the ozonation of the water in tank C being effected very much more rapidly than would be possible if the ozonizing agent after once passing through tank C were permitted to escape) having been maintained until the sterilization of the body of water in tank C has been accomplished, water is admitted through pipe D to the atomizing nozzles *d*, the valve *j* is closed and the valve *g'* on the water delivery pipe G is opened. When this has been done the apparatus is in its normal working condition, that is to say the water which is admitted at the top of the tower and, after passing through the latter, passes off through the delivery pipe G, absorbs the gaseous agent introduced from H, any organisms which, in passing with the water through the upper portion or portions of the tower, have not succumbed to the action of the ascending and progressively weakened stream of sterilizing agent, being destroyed on encountering the freshly introduced sterilizing medium at the lower part of the tower.

Claim:

An apparatus for effecting the sterilization of water by ozonation comprising a tower, a pile of coarse but symmetrically granular material therein, a water inlet at the top of said tower arranged to distribute water over said pile of material, an inlet for the sterilization agent at the bottom of said tower provided with a series of upwardly directed nozzles, a pressure creating device connected with said sterilizing agent inlet, a pipe connected with the inlet of said pressure creating device and with the upper end of said tower, said pipe being provided with an expansion chamber, a drier in said pipe between said expansion chamber and said pressure creating device, an air inlet connected with said pipe, a check valve controlling said air inlet, and an air filter in said air inlet beyond said valve.

EDWARD LIONEL JOSEPH.

Witnesses:
F. L. RAND,
A. NUTTING.